(12) United States Patent
Suzuki et al.

(10) Patent No.: US 11,694,715 B2
(45) Date of Patent: Jul. 4, 2023

(54) HEAD SUSPENSION ASSEMBLY AND DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yasuo Suzuki, Fujisawa Kanagawa (JP); Takuma Kido, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/668,958

(22) Filed: Feb. 10, 2022

(65) Prior Publication Data

US 2023/0029666 A1    Feb. 2, 2023

(30) Foreign Application Priority Data

Jul. 30, 2021    (JP) ................................. 2021-125386

(51) Int. Cl.
*G11B 5/48*    (2006.01)

(52) U.S. Cl.
CPC ................................. *G11B 5/484* (2013.01)

(58) Field of Classification Search
None
See application file for complete search history.

(56) References Cited

U.S. PATENT DOCUMENTS

| | | | |
|---|---|---|---|
| 9,251,817 B1 | 2/2016 | Hahn et al. | |
| 10,984,825 B2* | 4/2021 | Suzuki | G11B 5/484 |
| 2014/0085754 A1* | 3/2014 | Hanya | G11B 5/483 |
| | | | 360/244.5 |
| 2014/0085755 A1* | 3/2014 | Hanya | G11B 5/483 |
| | | | 360/244.5 |
| 2015/0187377 A1* | 7/2015 | Fujimura | G11B 5/4826 |
| | | | 360/244.1 |
| 2019/0066720 A1* | 2/2019 | Yamada | G11B 5/4833 |
| 2019/0108853 A1* | 4/2019 | Yamada | G11B 5/4833 |
| 2020/0286511 A1* | 9/2020 | Nesori | H01L 41/0472 |

(Continued)

FOREIGN PATENT DOCUMENTS

| | | |
|---|---|---|
| JP | H11-178097 A | 7/1999 |
| JP | 2012-184927 A | 9/2012 |

*Primary Examiner* — William J Klimowicz
(74) *Attorney, Agent, or Firm* — Kim & Stewart LLP (57) ABSTRACT

A head suspension assembly includes a support plate, a wiring member on the support plate, a head mounted on the wiring member and electrically connected to the wiring member, and a piezoelectric element mounted on the wiring member. The piezoelectric element has first and second electrodes electrically connected to the wiring member. The wiring member includes a metal layer, a base insulating layer, a conductive layer, and a cover insulating layer stacked in order. The cover insulating layer includes a pad opening through which the first electrode is connected to the conductive layer with a conducive adhesive therebetween. The base insulating layer includes a first region below the first pad opening and a second region below a side surface of the piezoelectric element. A thickness of the base insulating layer in the second region is less than a thickness of the base insulating layer in the first region.

17 Claims, 7 Drawing Sheets

(56) References Cited

U.S. PATENT DOCUMENTS

| | | | |
|---|---|---|---|
| 2020/0381013 A1* | 12/2020 | Suzuki | G11B 5/4873 |
| 2021/0210117 A1* | 7/2021 | Suzuki | G11B 5/4873 |
| 2022/0076698 A1* | 3/2022 | Nesori | G11B 5/4873 |
| 2022/0157337 A1* | 5/2022 | Aoki | G11B 5/4833 |

* cited by examiner

HEAD SUSPENSION ASSEMBLY AND DISK DEVICE

CROSS-REFERENCE TO RELATED APPLICATION(S)

This application is based upon and claims the benefit of priority from Japanese Patent Application No. 2021-125386, filed Jul. 30, 2021, the entire contents of which are incorporated herein by reference.

FIELD

Embodiments described herein relate generally to a head suspension assembly and a disk device including the same.

BACKGROUND

A disk device, such as a hard disk drive (HDD), includes a plurality of magnetic disks rotatably disposed in a housing, a plurality of magnetic heads, and a head actuator. Each magnetic head reads and writes information from/into its corresponding magnetic disk, and the head actuator movably supports the magnetic heads with respect to the magnetic disks.

The head actuator includes a plurality of head suspension assemblies which supports the magnetic heads at tip portions thereof, respectively. The head suspension assembly includes a base plate having one end fixed to an arm, a load beam extending from the base plate, and a flexure provided on the load beam and the base plate. The magnetic head is supported by a gimbal section of the flexure.

A head suspension assembly of one type has a piezoelectric element as a microactuator. The piezoelectric element is mounted on a flexure. An electrode of the piezoelectric element is electrically and physically connected to a conductor pattern of the flexure, such as a conductive pad, using a conductive adhesive.

DETAILED DESCRIPTION

Embodiments provide a head suspension assembly and a disk device, in which a short-circuit of electrodes of a piezoelectric element is prevented and reliability of electrical connection is improved.

In general, according to an embodiment, a head suspension assembly includes a support plate, a wiring member on the support plate, a head mounted on the wiring member and electrically connected to the wiring member, and a piezoelectric element mounted on the wiring member. The piezoelectric element has first and second electrodes electrically connected to the wiring member. The wiring member includes a metal layer, a base insulating layer, a conductive layer, and a cover insulating layer stacked in order. The cover insulating layer includes a pad opening through which the first electrode is connected to the conductive layer with a conducive adhesive therebetween. The base insulating layer includes a first region below the first pad opening and a second region below a side surface of the piezoelectric element. A thickness of the base insulating layer in the second region is less than a thickness of the base insulating layer in the first region.

Hereinafter, a disk device according to embodiments will be described with reference to drawings.

The disclosure is merely an example, and aspects that those skilled in the art can easily derive appropriate changes while maintaining the gist of the disclosure are naturally included in the scope of the present disclosure. In order to clarify explanations, in drawings, the size, the shape, etc. of each element may be schematically represented as compared to those in an actual mode in some cases. However, this is merely an example, and does not limit the interpretation of the present disclosure. In the present specification and each drawing, some elements which are the same as elements previously described regarding a previously mentioned drawing may be denoted by the same reference numerals, and detailed descriptions thereof may be appropriately omitted.

First Embodiment

As a disk device, a hard disk drive (HDD) according to a first embodiment will be described in detail.

Figure 1:
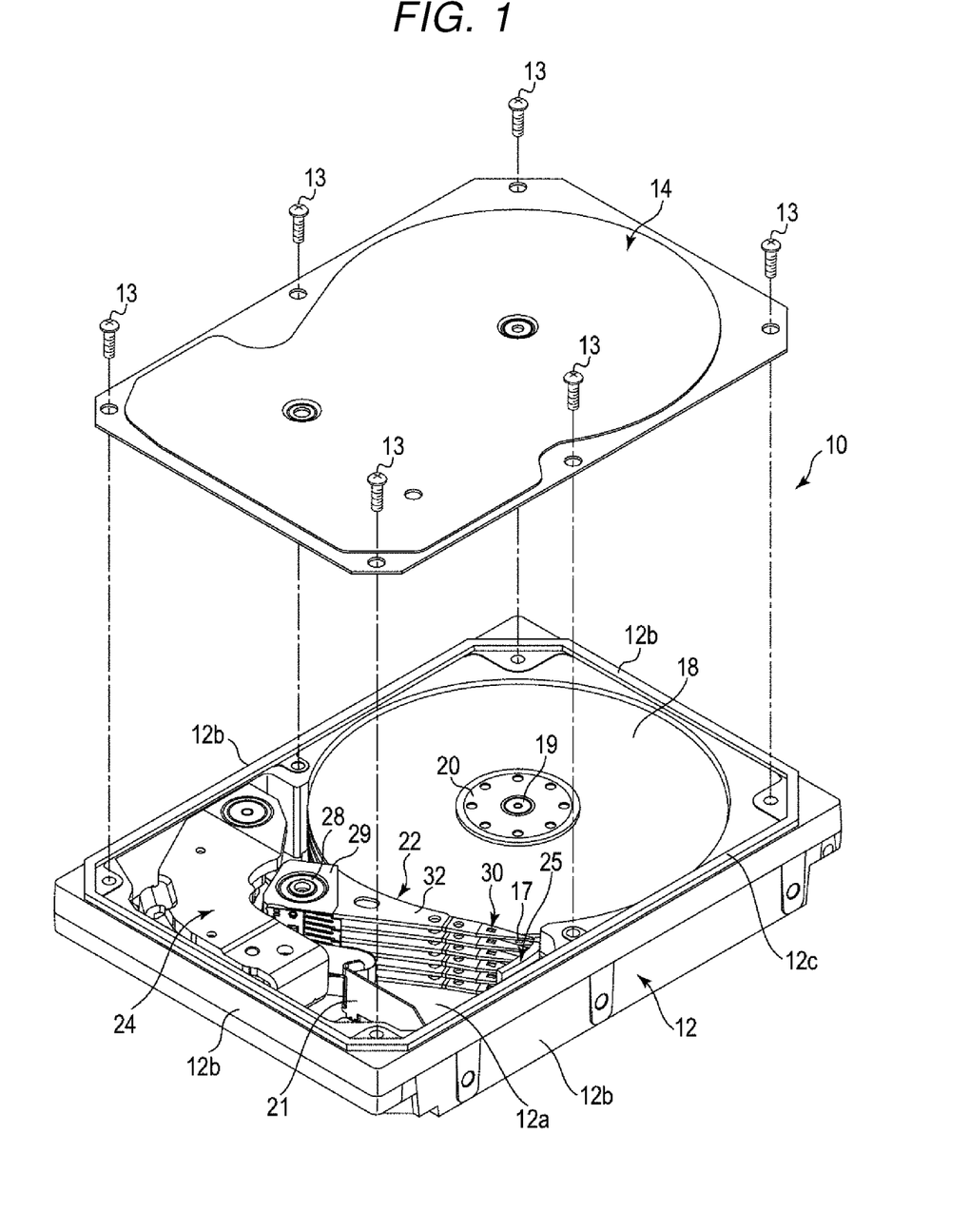
FIG. 1 illustrates an exploded view of a hard disk drive (HDD) according to a first embodiment.

FIG. 1 illustrates an exploded perspective view of an HDD according to the first embodiment, in which a cover is removed. As illustrated, the HDD includes a rectangular housing 10. The housing 10 includes a rectangular box-shaped base 12 having a top opening, and a cover (top cover) 14. The base 12 has a rectangular bottom wall 12a, and side walls 12b erected along the peripheral edges of the bottom wall 12a, and is integrally molded by using, for example, aluminum. The cover 14 is made of stainless steel and is formed into, for example, a rectangular plate shape. The cover 14 is screwed onto the side walls 12b of the base 12 by a plurality of screws 13, and airtightly closes the upper opening of the base 12.

In the housing 10, a plurality of magnetic disks 18 (for example, five sheets) as disc-shaped recording media, and a spindle motor 19 that supports and rotates the magnetic disks 18 are provided. The spindle motor 19 is disposed on the bottom wall 12a.

Each magnetic disk 18 is formed into, for example, a disc shape having a diameter of 95 mm (3.5 inches), and has a magnetic recording layer on the upper surface and/or the lower surface thereof. The magnetic disks 18 are coaxially fit to a hub (not illustrated) of the spindle motor 19, and are fixed to the hub by a clamp spring 20. The magnetic disks 18 are supported while positioned in parallel to the bottom wall 12a of the base 12. The plurality of magnetic disks 18 is rotated by the spindle motor 19 at a predetermined rotation speed.

The number of the magnetic disks 18 is not limited to five, and may be increased or decreased. A single magnetic disk 18 may be accommodated in the housing 10.

In the housing 10, a plurality of magnetic heads 17 (see FIG. 2) which records and reproduces information into/from the magnetic disks 18, and a head actuator 22 that movably supports these magnetic heads 17 with respect to the magnetic disks 18 are provided. Further, in the housing 10, a voice coil motor (VCM) 24 that rotates and positions the head actuator 22, a ramp load mechanism 25 that holds the magnetic head 17 at an unload position away from the magnetic disk 18 when the magnetic head 17 moves to the outermost circumference of the magnetic disk 18, and a board unit (FPC unit) 21 on which electronic components such as a conversion connector are mounted are provided.

The head actuator 22 includes an actuator block 29 with a bearing unit 28, a plurality of arms 32 extending from the actuator block 29, and a plurality of suspension assemblies 30 (referred to as head gimbal assemblies (HGAs) in some cases) extending from the arms 32, respectively. The magnetic head 17 is supported at the tip portion of each suspension assembly 30. The head actuator 22 is rotatably supported by a pivoting shaft erected on the bottom wall 12a, via the bearing unit 28.

A printed circuit board (not illustrated) is screwed to the outer surface of the bottom wall 12a. A controller is configured on the printed circuit board, and the controller controls the operation of the spindle motor 19 while controlling the operation of the VCM 24 and the magnetic heads 17 via the board unit 21.

Next, the configuration of the suspension assembly 30 will be described in detail.

Figure 2:
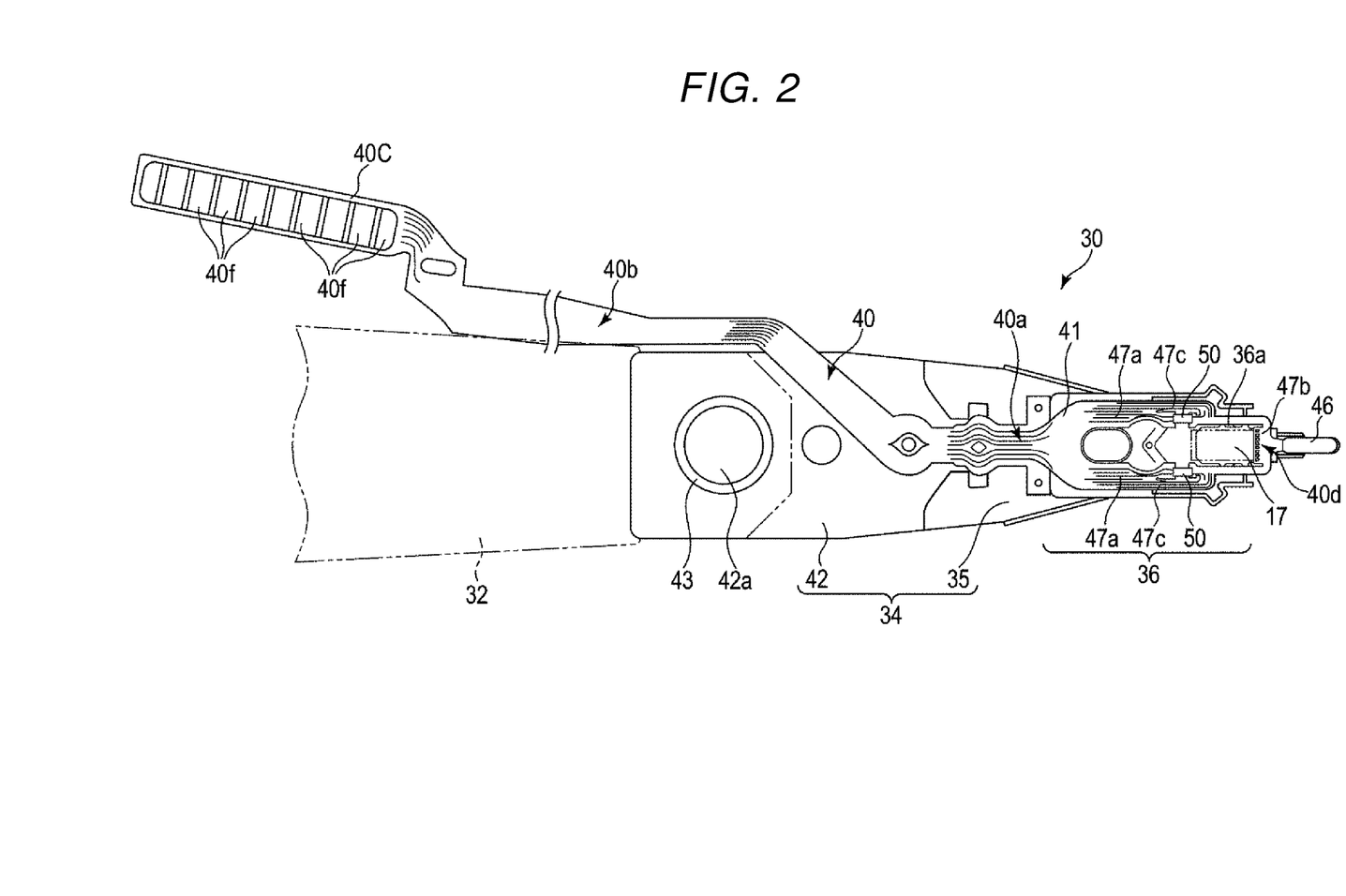
FIG. 2 illustrates a plan view of a head suspension assembly of the HDD.

FIG. 2 illustrates a plan view of a head suspension assembly.

As illustrated in FIG. 2, each suspension assembly 30 includes a suspension 34 extending from the arm 32, and the magnetic head 17 is attached to the tip portion of the suspension 34. The magnetic head 17 and the suspension assembly 30 supporting the magnetic head 17 are collectively referred to as a head suspension assembly.

The suspension 34 functioning as a support plate includes a rectangular base plate 42 formed of a metal plate having a thickness of several hundred microns, and an elongated leaf spring-shaped load beam 35 formed of a metal plate having a thickness of several tens of microns. The load beam 35 has a base end portion disposed and superimposed on the distal end portion of the base plate 42, and is fixed to the base plate 42 through welding at a plurality of locations. The base end portion of the load beam 35 has substantially the same width as the width of the base plate 42. A rod-shaped tab 46 is provided at the tip of the load beam 35 to protrude therefrom.

The base plate 42 has a circular opening 42a at its base end portion and an annular protrusion 43 located around the opening. The base plate 42 is fastened to the distal end portion of the arm 32 by fitting the protrusion 43 into a caulking hole of the arm 32, and caulking the protrusion 43. The base end of the base plate 42 may be fixed to the distal end of the arm 32 by laser welding, spot welding, or adhesion.

The suspension assembly 30 includes an elongated strip-shaped flexure (may be referred to as "wiring member") 40 for transferring recording and reproducing signals and a driving signal of a piezoelectric element 50, and a couple of piezoelectric elements (may be referred to as "PZT elements") 50 mounted on the flexure 40. As illustrated in FIG. 2, a distal end portion 40a of the flexure 40 is disposed on the load beam 35 and the base plate 42, and a latter half portion (may be referred to as "extension portion") 40b extends outward from the side edge of the base plate 42, and extends along the side edge of the arm 32. A connection edge 40c located at the distal end of the extension portion 40b has a plurality of connection pads 40f. These connection pads 40f are connected to a main FPC of the above-described board unit 21.

Figure 3:
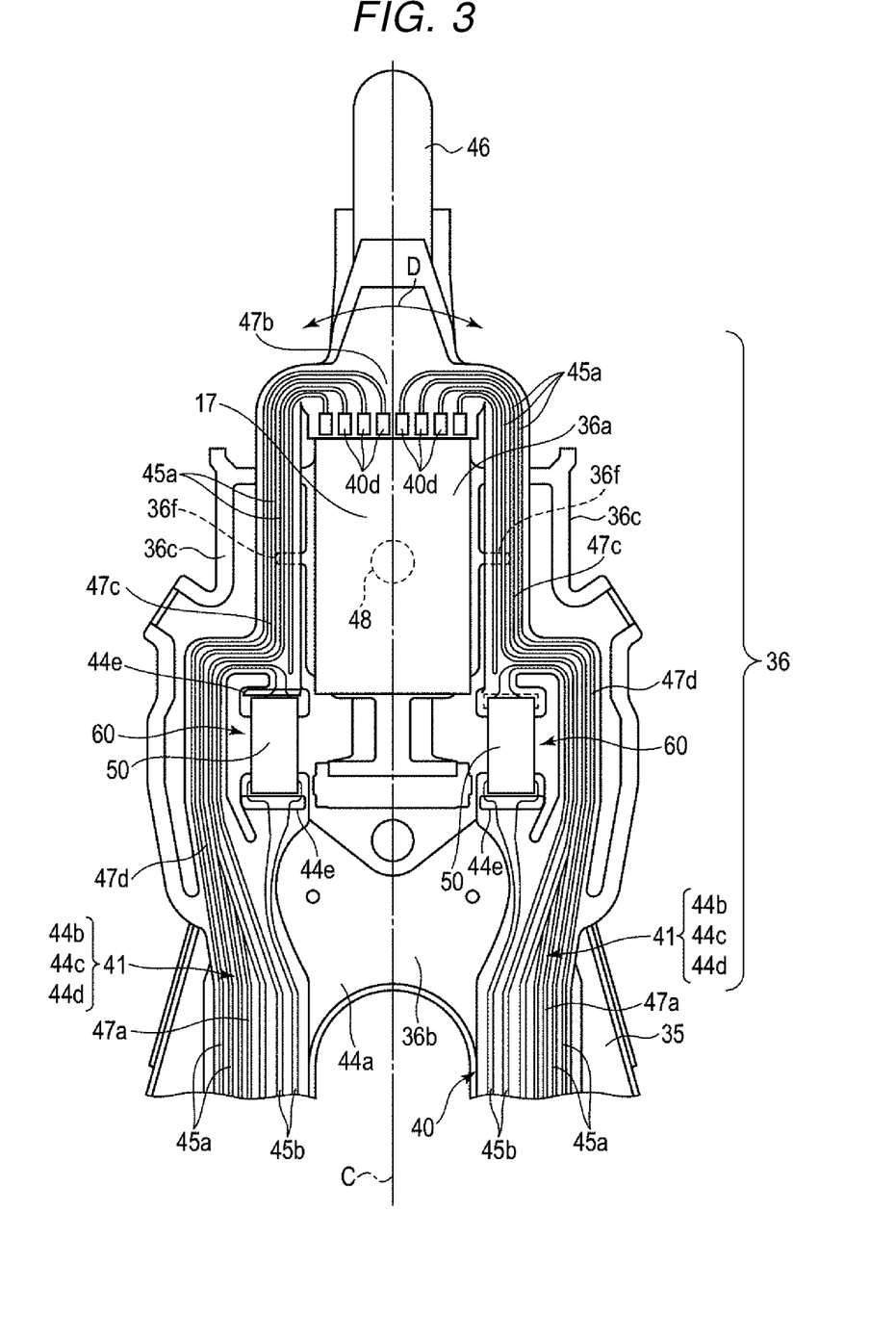
FIG. 3 illustrates an enlarged plan view of a tip portion of the head suspension assembly.

FIG. 3 illustrates a plan view of a tip portion of the suspension assembly 30, in an enlarged scale.

As illustrated, the distal end portion of the flexure 40 is located on the tip portion of the load beam 35, and constitutes a gimbal section 36 functioning as an elastic support. The magnetic head 17 is placed and fixed on the gimbal section 36, and is supported by the load beam 35 via the gimbal section 36. The pair of piezoelectric elements 50, functioning as driving elements, is mounted on a mounting portions 60 of the gimbal section 36, and is located on the base end of the load beam 35 with respect to the magnetic head 17.

The flexure 40 has a thin metal plate 44a such as stainless steel, as a base, and a strip-shaped stacked member 41 attached to or fixed on the thin metal plate 44a, and forms an elongated stacked plate. The stacked member 41 has a base insulating layer 44b, most of which is fixed to the thin metal plate 44a, a conductive layer (may be referred to as "wiring pattern") 44c that is formed on the base insulating layer 44b and forms a plurality of signal wirings 45a, a drive wiring 45b, and a plurality of connection pads, and a cover insulating layer 44d (see FIG. 6) that is stacked on the base insulating layer 44b while covering the conductive layer 44c. As for the conductive layer 44c, for example, copper foil may be used.

In the gimbal section 36 of the flexure 40, the thin metal plate 44a has a rectangular tongue portion (may be referred to as "support") 36a located on the tip side, a substantially rectangular base end portion (may be referred to as "base end plate portion") 36b located on the base end with a space present between the tongue portion 36a and the base end portion 36b, a pair of elongated outriggers (may be referred to as "links") 36c extending from the tongue portion 36a to the base end portion 36b, and a pair of handles (may be referred to as "supporting protrusions") 36f protruding from side edges of the tongue portion 36a, respectively.

The base end portion 36b is attached to the surface of the load beam 35, or is fixed on the surface of the load beam 35 through spot welding. The tongue portion 36a is formed into a size and a shape which allow the magnetic head to be placed, and is formed into, for example, a substantially rectangular shape. The tongue portion 36a is disposed such that its center axis line in the width direction coincides with the center axis line C of the suspension 34. The substantially central portion of the tongue portion 36a is in contact with a dimple (may be referred to as "convex portion") 48 provided at the tip of the load beam 35 to protrude therefrom. The position of the tongue portion 36a may be varied in various directions by elastically deforming the pair of outriggers 36c. Accordingly, the tongue portion 36a and the magnetic head 17 flexibly follow the surface fluctuations of the magnetic disk 18 with respect to roll and pitch directions, and a minute gap may be maintained between the surface of the magnetic disk 18 and the magnetic head 17.

In the gimbal section 36, a part of the stacked member 41 of the flexure 40 is bifurcated, and the bifurcated parts are located on both sides of the center axis line C of the suspension 34. The stacked member 41 has a base end portion 47a fixed to the base end portion 36b of the metal plate 44a, a tip portion 47b attached to the tongue portion 36a, a pair of strip-shaped first bridge portions 47c extending from the base end portion 47a to the tip portion 47b, and a pair of strip-shaped second bridge portions 47d. The strip-shaped second bridge portions 47d extend from the base end portion 47a to middle portions of the first bridge portions 47c in parallel to the first bridge portions 47c, respectively, and then join the first bridge portions 47c, respectively. The first bridge portions 47c are located on both sides of the tongue portion 36a alongside the outriggers 36c, and extend along the longitudinal direction of the load beam 35. The first bridge portions 47c extend while passing above the handles 36f and above the crossbars of the outriggers 36c, and are partially fixed to the handles 36f and the crossbars of the outriggers 36c. A part of each first bridge portion 47c constitutes the mounting portion 60 on which the piezoelectric element 50 is mounted.

The magnetic head 17 is fixed to the tongue portion 36a with an adhesive. The magnetic head 17 is disposed such that the center axis line in the longitudinal direction coincides with the center axis line of the suspension 34, and the substantially central portion of the magnetic head 17 is located above the dimple 48. The recording element and the reproduction element of the magnetic head 17 are electrically bonded to a plurality of connection pads 40d of the tip portion 47b by a conductive adhesive such as solder or silver paste. Accordingly, the magnetic head 17 is connected to the signal wirings 45a via the connection pads 40d.

The mounting portion 60 and the piezoelectric element 50 will be described below in detail.

Figure 4:
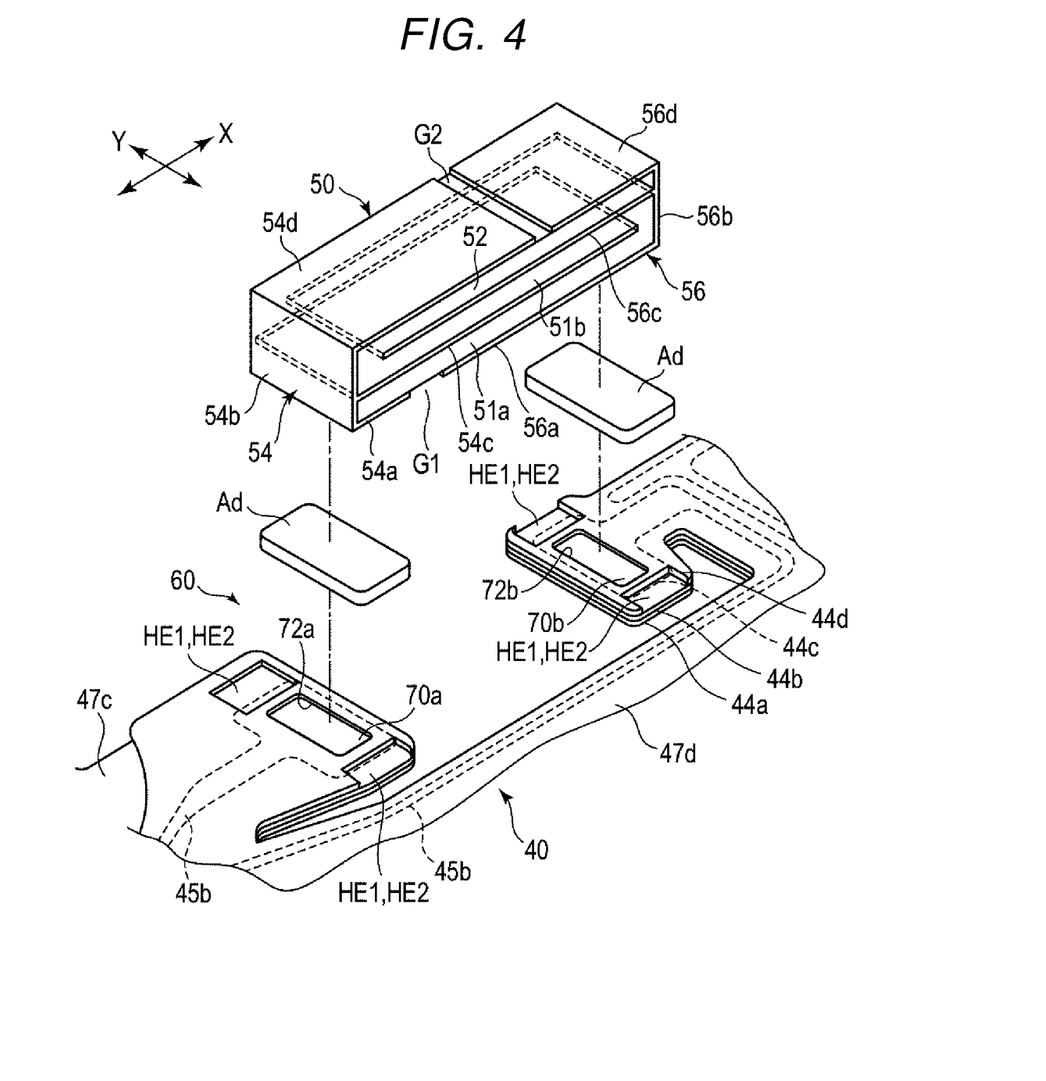
FIG. 4 illustrates an exploded perspective view of pad portions of a flexure and piezoelectric elements in the head suspension assembly.
Figure 5:
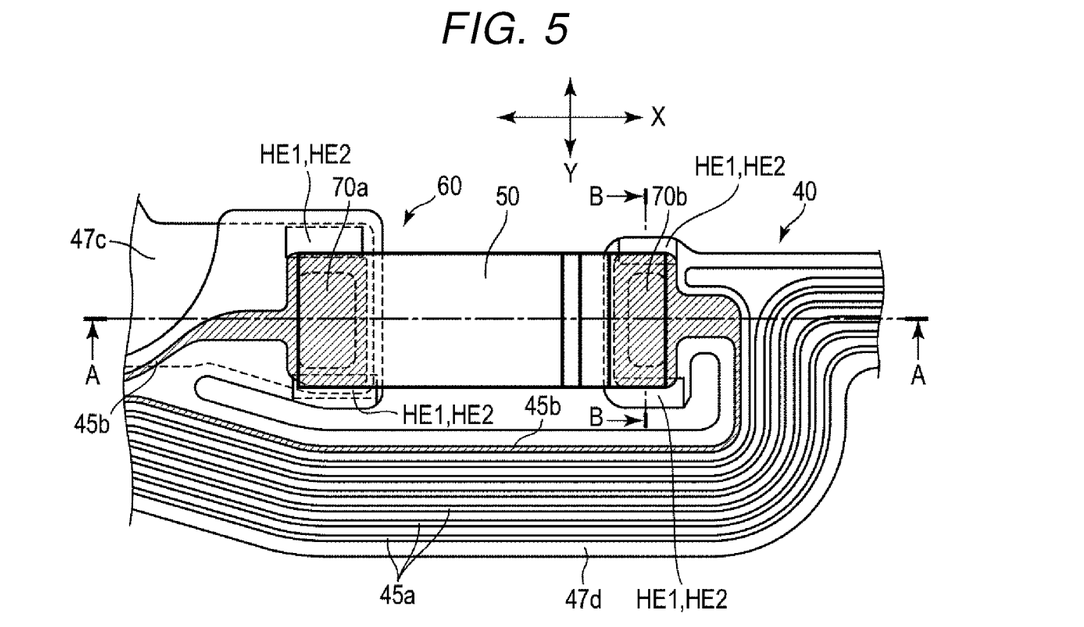
FIG. 5 illustrates a plan view of the pad portion of the flexure and the piezoelectric element.
Figure 6:
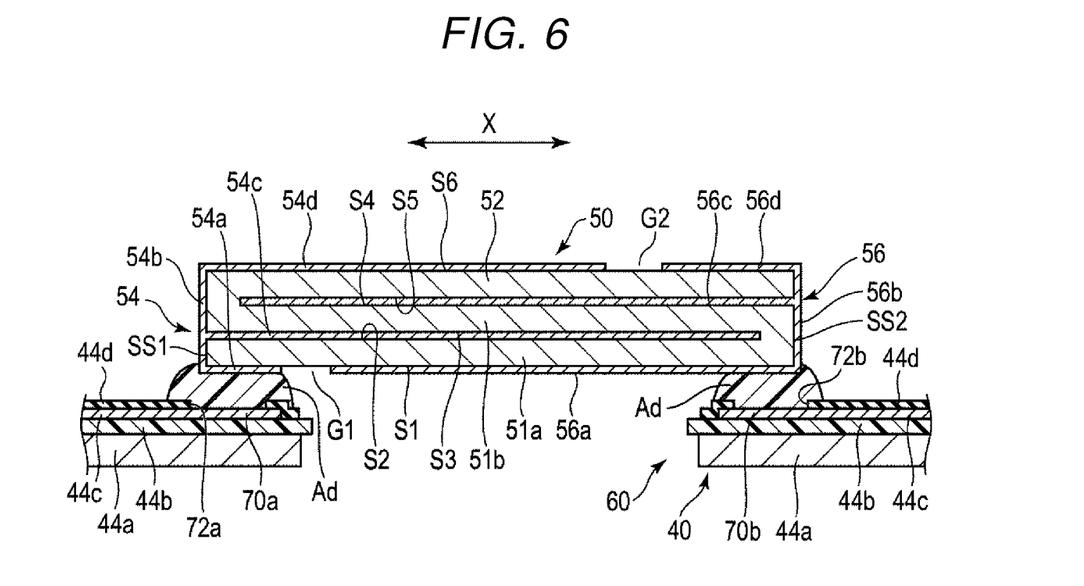
FIG. 6 illustrates a cross-sectional view of the pad portion and the piezoelectric element taken along line A-A in FIG. 5.

FIG. 4 illustrates an exploded perspective view of the mounting portion of the flexure 40 and the piezoelectric element. FIG. 5 illustrates a plan view of the mounting portion on which the piezoelectric element is mounted. FIG. 6 illustrates a cross-sectional view of the mounting portion and the piezoelectric element taken along a line A-A in FIG. 5.

As illustrated in FIG. 4 and FIG. 6, the flexure 40 has the thin metal plate 44a such as stainless steel, as a base, and the strip-shaped stacked member 41 attached to or fixed on the metal plate 44a, and forms an elongated stacked plate. The stacked member 41 has the base insulating layer 44b, most of which is fixed to the metal plate 44a, the conductive layer 44c that is formed on the base insulating layer 44b and forms the plurality of signal wirings 45a, the drive wiring 45b, and the plurality of connection pads, and the cover insulating layer 44d that is stacked on the base insulating layer 44b while covering the conductive layer 44c. As for the conductive layer 44c, for example, copper foil may be used.

The mounting portion 60 includes a first connection pad 70a and a second connection pad 70b each of which is formed of the conductive layer 44c. Each of the first connection pad 70a and the second connection pad 70b is electrically connected to the drive wiring 45b formed of the conductive layer 44c. The first connection pad 70a and the second connection pad 70b are arranged at a predetermined interval in a direction parallel to the center axis line C of the load beam 35. In the present embodiment, the first bridge portion 47c of the flexure 40 is divided between the first connection pad 70a and the second connection pad 70b.

Accordingly, the first connection pad 70a and the second connection pad 70b are arranged with a predetermined space therebetween.

Openings (which may be referred to as "pad openings") 72a and 72b are formed in the cover insulating layer 44d stacked on the conductive layer 44c, at positions overlapping the first connection pad 70a and the second connection pad 70b, respectively. Most of the first connection pad 70a and most of the second connection pad 70b are exposed on the outer surface of the cover insulating layer 44d through the openings 72a and 72b, respectively. As an example, each of the first connection pad 70a and the second connection pad 70b is formed into a rectangular shape. Similarly, each of the openings 72a and 72b is formed into a rectangular shape having a slightly smaller dimension than the corresponding connection pad.

As illustrated in FIG. 4 and FIG. 6, the piezoelectric element 50 includes, as an example, a first piezoelectric substrate 51a and a second piezoelectric substrate 51b made of a piezoelectric material and formed into flat rectangular parallelepiped shapes, and a first electrode 54 and a second electrode 56 for applying a voltage to the piezoelectric substrates 51a and 51b. The longitudinal direction of the piezoelectric element 50 is X direction, and the width direction orthogonal to the longitudinal direction is Y direction. In the present embodiment, the piezoelectric element 50 further includes a restraint layer 52 for restricting bending of the first and second piezoelectric substrates 51a and 51b. The restraint layer 52 has substantially the same dimension as the first and second piezoelectric substrates 51a and 51b, and is stacked on the second piezoelectric substrate 51b. As for the piezoelectric material, for example, lead zirconate titanate, ceramic, etc. are used. As an example, the restraint layer 52 is made of the same piezoelectric material as that of the piezoelectric substrates 51a and 51b. The restraint layer 52 may be made of other materials than the piezoelectric material.

The rectangular parallelepiped element composed of the first piezoelectric substrate 51a, the second piezoelectric substrate 51b, and the restraint layer 52, which are stacked, has a first main surface S1 as a lower surface, a sixth main surface S6 as an upper surface, opposing side surfaces SS1 and SS2 on short sides (may be referred to as "lateral sides"), and opposing side surfaces SL1 and SL2 on longitudinal sides. The first piezoelectric substrate 51a has the above first main surface S1, and a second main surface S2 facing the first main surface S1. The second piezoelectric substrate 51b has a third main surface S3 facing the second main surface S2 of the first piezoelectric substrate 51a, and a fourth main surface S4 opposite to the third main surface S3. Further, the restraint layer 52 has a fifth main surface S5 facing the fourth main surface S4 of the second piezoelectric substrate 51b, and the above sixth main surface (upper surface) S6 opposite to the fifth main surface S5.

The first electrode 54 integrally has a first electrode portion 54a provided on one end of the first main surface S1 in the longitudinal direction (i.e., X direction), a second electrode portion 54b provided on the side surface SS1, a third electrode portion 54c provided on the second main surface S2 and extending from one side surface SS1 (i.e., the second electrode portion 54b) to the vicinity of the other side surface SS2, and a fourth electrode portion 54d provided on the sixth main surface S6 and extending from one side surface SS1 (i.e., the second electrode portion 54b) to the vicinity of the other side surface SS2. The first electrode 54 has the same width in the width direction (i.e., Y direction) as the widths of the piezoelectric substrates 51a and 51b and the restraint layer 52. Both side edges of the first electrode 54 are aligned with the side surfaces SL1 and SL2 on longitudinal sides, and are exposed on these side surfaces SL1 and SL2. The end edge of the first electrode portion 54a extends substantially in parallel to the side surface SS1. The first electrode 54 is formed on the surfaces of the piezoelectric substrate 51a and on the restraint layer 52 by sputtering, chemical vapor deposition (CVD), spin coating, or the like.

The second piezoelectric substrate 51b overlaps the second main surface S2 of the first piezoelectric substrate 51a and the third electrode portion 54c. One end of the second piezoelectric substrate 51b is connected to the first piezoelectric substrate 51a between the extension end of the third electrode portion 54c and the side surface SS2.

Meanwhile, the second electrode 56 integrally has a fifth electrode portion 56a provided on the first main surface S1, a sixth electrode portion 56b provided on the side surface SS2, a seventh electrode portion 56c provided on the fourth main surface S4 of the second piezoelectric substrate 51b and extending from one side surface SS2 (i.e., the sixth electrode portion 56b) to the vicinity of the other side surface SS1, and an eighth electrode portion 56d provided on the sixth main surface S6 and extending from one side surface SS2 (i.e., the sixth electrode portion 56b) to the vicinity of the fourth electrode portion 54d. The second electrode 56 has the same width in the width direction as the widths of the piezoelectric substrates 51a and 51b, and both side edges of the second electrode 56 are at positions aligned with both side surfaces SL1 and SL2 of the piezoelectric element 50, and are exposed on both side surfaces SL1 and SL2. The second electrode 56 is formed on the surfaces of the piezoelectric substrates 51a and 51b and on the restraint layer 52 by sputtering, chemical vapor deposition (CVD), spin coating or the like.

The fifth electrode portion 56a extends from the vicinity of the first electrode portion 54a to the side surface SS2, and covers almost the entire first main surface S1. On the first main surface S1, the end edge of the fifth electrode portion 56a extends substantially in parallel to the side surface SS1, and faces the end edge of the first electrode portion 54a with a gap G1. The fifth electrode portion 56a faces the third electrode portion 54c substantially in parallel to each other, with the first piezoelectric substrate 51a interposed therebetween.

The seventh electrode portion 56c faces the third electrode portion 54c substantially in parallel to each other, with the second piezoelectric substrate 51b interposed therebetween. On the sixth main surface S6, the eighth electrode portion 56d extends from the side surface SS2 to the vicinity of the fourth electrode portion 54d. The end edge of the eighth electrode portion 56d extends substantially in parallel to the side surface SS2, and faces the end edge of the fourth electrode portion 54d with a gap G2.

The restraint layer 52 overlaps the fourth main surface S4 of the second piezoelectric substrate 51b and the seventh electrode portion 56c. One end of the restraint layer 52 is connected to the second piezoelectric substrate 51b between the extension end of the seventh electrode portion 56c and the side surface SS1.

As illustrated in FIGS. 4, 5, and 6, the piezoelectric element 50 configured as described above is disposed on the mounting portion 60, in a state where the first main surface S1 side of the first piezoelectric substrate 51a faces the mounting portion 60 of the flexure 40, and in a state where the first electrode portion 54a of the first electrode 54 faces the first connection pad 70a, and the fifth electrode portion 56a of the second electrode 56 faces the second connection pad 70b. The first electrode portion 54a is electrically and physically connected to the first connection pad 70a with a conductive adhesive material Ad filled between the first electrode portion 54a and the first connection pad 70a. The fifth electrode portion 56a is electrically and physically connected to the second connection pad 70b by a conductive adhesive material Ad filled between the end of the fifth electrode portion 56a on the side surface SS2 side and the second connection pad 70b.

That is, the piezoelectric element 50 is mounted on the mounting portion 60 of the flexure 40, and is connected to the drive wiring 45b via the first connection pad 70a and the second connection pad 70b. The piezoelectric element 50 is disposed such that the longitudinal direction (i.e., X direction) extends substantially in parallel to the center axis line C of the suspension 34.

For example, the second electrode 56 is connected to the ground via the second connection pad 70b. A drive voltage is applied to the first electrode 54 via the drive wiring 45b and the first connection pad 70a. When the drive voltage is applied, a voltage is applied between the third electrode portion 54c of the first electrode 54 and the fifth electrode portion 56a of the second electrode 56, and acts on the first piezoelectric substrate 51a located between these electrode portions. When the drive voltage is applied, a voltage is applied between the third electrode portion 54c of the first electrode 54 and the seventh electrode portion 56c of the second electrode 56, and acts on the second piezoelectric substrate 51b located between these electrode portions.

When a voltage is applied, the first piezoelectric substrate 51a and the second piezoelectric substrate 51b expand and contract in the longitudinal direction. As the piezoelectric substrates 51a and 51b expand and contract, the piezoelectric substrates 51a and 51b try to deform so as to cause curve or bending. However, due to the restraint layer 52, the above curve or bending of the piezoelectric substrates 51a and 51b is restrained. Accordingly, the amount of expansion and contraction of the piezoelectric substrates 51a and 51b in the longitudinal direction, that is, the amount of operations may be set to a desired amount.

According to the present embodiment, each mounting portion 60 of the flexure 40 has recesses (etched regions) provided on both sides of the first connection pad 70a in the width direction and recesses (etched regions) provided on both sides of the second connection pad 70b in the width direction.

Figure 7:
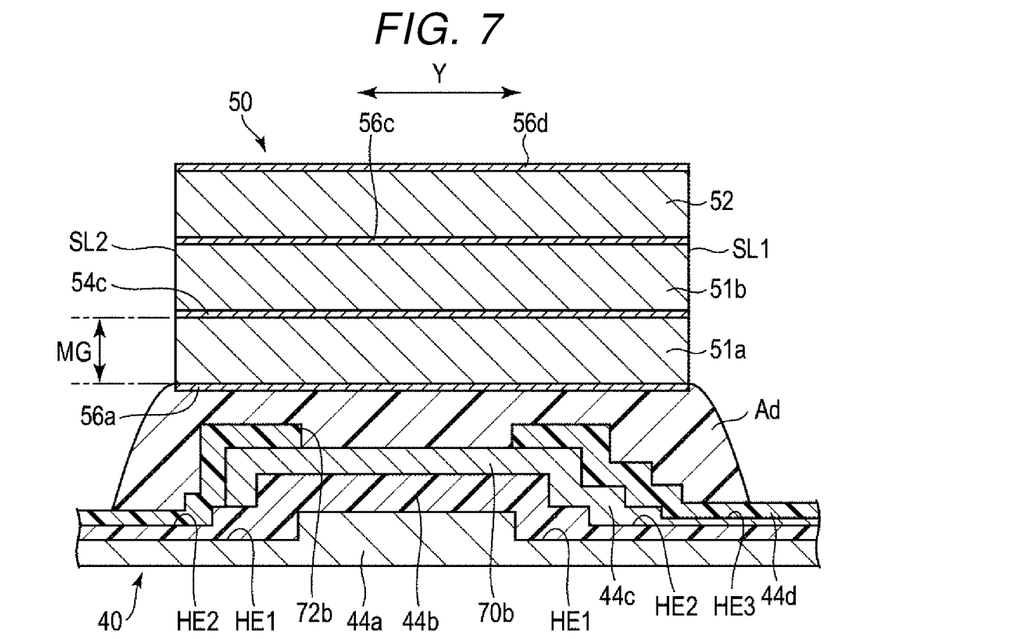
FIG. 7 illustrates a cross-sectional view of the pad portion and the piezoelectric element taken along line B-B in FIG. 5.

FIG. 7 illustrates a cross-sectional view of the mounting portion and the piezoelectric element taken along a line B-B in FIG. 5.

As illustrated in FIG. 4 and FIG. 7, in the mounting portion on the side of the second connection pad 70b, a plurality of recesses HE1 is formed in the metal plate 44a of the flexure 40. The recesses HE1 are formed by half-etching, for example, a part of the metal plate 44a and reducing the plate thickness to about nearly ½. Each recess HE1 is formed into, for example, a substantially rectangular shape. A plurality of recesses HE1 are located on both sides of the second connection pad 70b in the width direction, respectively. More specifically, two recesses HE1 are located to face both ends of the piezoelectric element 50 in the width direction, respectively.

A part of the base insulating layer 44b stacked on the metal plate 44a is formed to overlap the recesses HE1, and then is recessed along the recesses HE1 to form a one-step lower recessed portion. Further, a plurality of recesses HE2 are formed in the recessed portions of the base insulating layer 44b. The recesses HE2 are formed by half-etching a part of the base insulating layer 44b and reducing the layer thickness to about nearly ½. Each recess HE2 is formed into, for example, a substantially rectangular shape. The recesses HE2 are located on both sides of the second connection pad 70b in the width direction, respectively. More specifically, two recesses HE2 are located to face both ends of the piezoelectric element 50 in the width direction, respectively.

The conductive layer 44c is stacked on the base insulating layer 44b, and a part thereof is formed to overlap the recesses HE2 of the base insulating layer 44b, and then is recessed along the recesses HE2 to form a one-step lower recessed portion. Further, a recess HE3 is formed in the recessed portion of the conductive layer 44c. The recess HE3 is formed by half-etching a part of the conductive layer 44c, and reducing the layer thickness to about nearly ½. The recess HE3 is formed into, for example, a substantially rectangular shape, and is located on one end of the second connection pad 70b in the width direction.

The cover insulating layer 44d is stacked on the conductive layer 44c and the base insulating layer 44b. A part of the cover insulating layer 44d is formed to overlap the recess HE3, and is recessed along the recess HE3 to form a one-step lower recessed portion.

As described above, the mounting portion 60 has the recesses HE1 and HE2 lowered by two steps, on both sides of the second connection pad 70b in the width direction, in regions facing the ends of the piezoelectric element 50 in the width direction. In the present embodiment, the mounting portion 60 has the recess HE3 further lowered by one step on one end of the second connection pad 70b in the width direction. In the same manner as above, the mounting portion 60 has substantially rectangular recesses HE1 and HE2 lowered by two steps, on both sides of the first connection pad 70a in the width direction, in regions facing the ends of the piezoelectric element 50 in the width direction, and has a recess HE3 further lowered by one step on one end in the width direction.

As illustrated in FIG. 7, in the regions where the recesses HE1 and HE2, and the recess HE3 are formed, distances between the cover insulating layer 44d and the lower surfaces of the ends of the piezoelectric element 50 in the width direction become large. A part of the conductive adhesive Ad filled between the lower surface of the piezoelectric element 50 and the second connection pad 70b flows into the regions where the above distance is increased. As a result, the conductive adhesive Ad pushed aside by the piezoelectric element 50 is less likely to be raised to the side surfaces SL1 and SL2 of the piezoelectric element 50. As a result, it is possible to sufficiently secure a gap margin MG between the conductive adhesive Ad and the intermediate electrode layer (the third electrode portion 54c) of the piezoelectric element 50. Then, it is possible to reduce short-circuit between the conductive adhesive and the third electrode portion 54c, that is, the risk of a short-circuit between the first electrode 54 (the third electrode portion 54c) and the second electrode 56 (the fifth electrode portion 56a) due to contact with the conductive adhesive.

Although not illustrated, in the mounting portion 60 on the side of the first connection pad 70a as well, similarly to the side of the second connection pad 70b, it is possible to sufficiently secure a gap margin MG between the conductive adhesive Ad and the electrode portion of the piezoelectric element 50, and it is possible to reduce the risk of a short-circuit between the first electrode 54 and the second electrode 56.

For the connection pads, the number of the recesses HE1 in the metal plate 44a and the number of the recesses HE2 in the base insulating layer 44b are not limited to two. One recess or three or more recesses may be formed for one connection pad. The shape of the recesses HE1, HE2, and HE3 is not limited to a rectangular shape, and various other shapes may be selected.

In the HDD configured as described above, when a voltage (driving signal) is applied to the piezoelectric element 50 via the drive wiring 45b, the piezoelectric element 50 expands and contracts along its longitudinal direction (a direction parallel to the center axis line C of the suspension). Through driving in opposite directions in which the two piezoelectric elements 50 expand and contract, the pair of first bridge portions 47c swing in the directions indicated by the arrow D in FIG. 3. The first bridge portions 47c rock the tongue portion 36a of the gimbal section 36 and the magnetic head 17 through the handles 36f, around the dimple 48 in the direction of the arrow D. In this manner, due to the expansion/contraction operations of the piezoelectric elements 50, the position of the magnetic head 17 may be slightly varied. The swing direction D of the magnetic head 17 corresponds to the seek direction (cross-track direction) of the magnetic head 17 on the magnetic disk 18.

According to the present embodiment, in the mounting portion 60 of the flexure 40 on which the piezoelectric element 50 is mounted, the recesses HE1 and HE2 are formed in regions facing the ends of the piezoelectric element 50 in the width direction, and a part of the cover insulating layer 44d is formed as recessed portions which are recessed along the recesses. In the recessed portions, a distance between the lower surface of the piezoelectric element 50 and the cover insulating layer 44d is widened, and therefore it is possible to sufficiently secure a gap margin MG between the conductive adhesive Ad and the electrode portion of the piezoelectric element 50. Accordingly, it is possible to reduce the risk of a short-circuit between the first electrode 54 and the second electrode 56.

As described above, according to the present embodiment, it is possible to provide a head suspension assembly and a disk device, in which a short-circuit between an electrode of a piezoelectric material and a conductive adhesive is prevented, and the reliability of electrical connection is improved.

Next, descriptions will be made on head suspension assemblies of HDDs according to other embodiments. In other embodiments to be described below, the same elements as those in the above described first embodiment are denoted by the same reference numerals and detailed descriptions thereof will be omitted or simplified.

Second Embodiment

Figure 8:
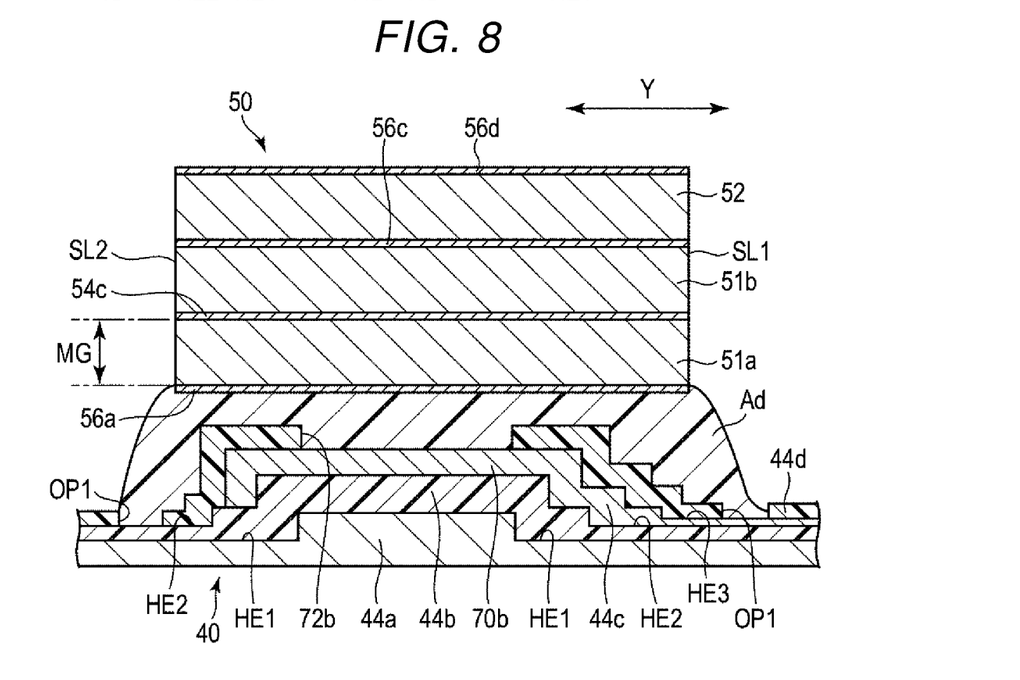
FIG. 8 illustrates a cross-sectional view of a pad portion and a piezoelectric element in an HDD according to a second embodiment.

FIG. 8 illustrates a cross-sectional view of a piezoelectric element and a mounting portion in a head suspension assembly according to a second embodiment.

As illustrated, according to the second embodiment, the mounting portion 60 of the flexure 40 has two openings OP1 formed in the cover insulating layer 44d. Each of the openings OP1 is formed in the region in the cover insulating layer 44d that overlaps the recess HE2 and the recess HE3. The opening OP1 is formed into, for example, a rectangular shape, and is formed in the recess HE2, at a position facing the end of the piezoelectric element 50 in the width direction, or at a position outside the above end.

The conductive adhesive Ad filled between the second connection pad 70b and the piezoelectric element 50 is located on the cover insulating layer 44d, and a part thereof also flows into the openings OP1.

In the second embodiment, other configurations for the head suspension assembly and the HDD are the same as those for the head suspension assembly and the HDD according to the first embodiment.

According to the second embodiment configured as described above, a part of the conductive adhesive Ad filled between the lower surface of the piezoelectric element 50 and the second connection pad 70b flows into the recessed portions in the cover insulating layer 44d, which are formed by the recesses HE1, HE2, and HE3, and the openings OP1. Accordingly, the conductive adhesive Ad pushed aside by the piezoelectric element 50 is less likely to be raised to the side surfaces SL1 and SL2 of the piezoelectric element 50. As a result, it is possible to sufficiently secure a gap margin MG between the conductive adhesive Ad and the intermediate electrode layer (the third electrode portion 54c) of the piezoelectric element 50. Then, it is possible to further reduce the risk of a short-circuit between the first electrode 54 and the second electrode 56.

As described above, according to the second embodiment, it is possible to provide a head suspension assembly and a disk device, in which a short-circuit between an electrode of a piezoelectric material and a conductive adhesive is prevented, and the reliability of electrical connection is improved.

Third Embodiment

Figure 9:
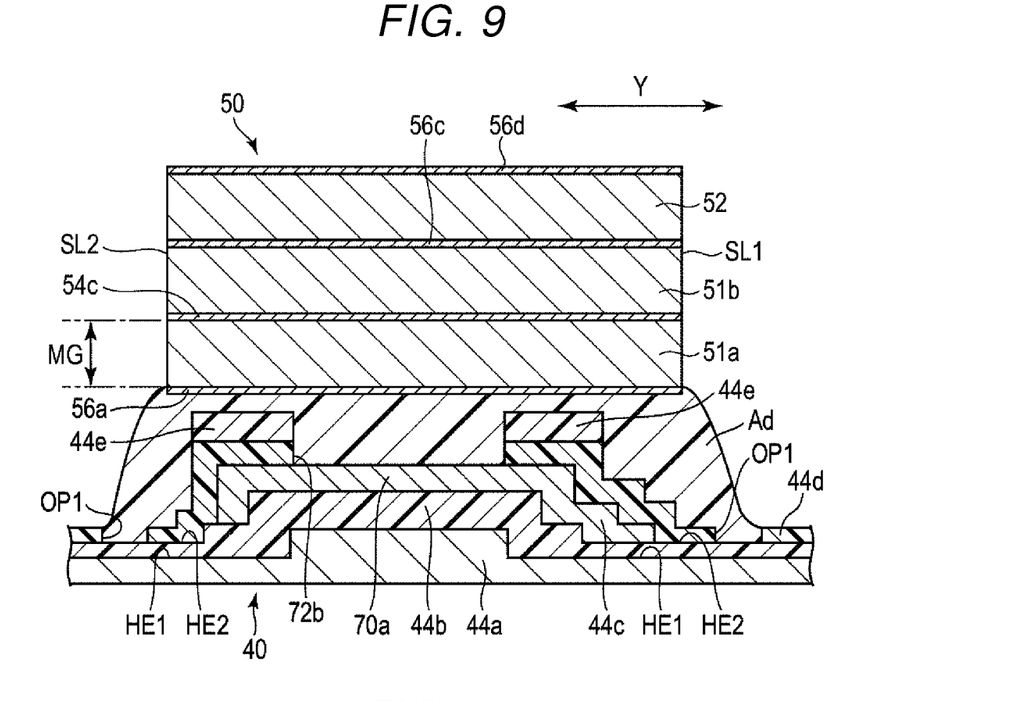
FIG. 9 illustrates a cross-sectional view of a pad portion and a piezoelectric element in an HDD according to a third embodiment.

FIG. 9 illustrates a cross-sectional view of a piezoelectric element and a mounting portion in a head suspension assembly according to a third embodiment.

As illustrated, according to the third embodiment, the mounting portion 60 of the flexure 40 further has two openings OP1 illustrated in the second embodiment, and a second cover insulating layer 44e stacked on the cover insulating layer 44d.

The second cover insulating layer 44e has, for example, a rectangular shape, and is stacked on the cover insulating layer 44d. Two cover insulating layers 44e are located selectively on both sides of (for example, around) the second connection pad 70b in the width direction, and are arranged so as to be aligned with side edges of the opening 72b.

In the present embodiment, the conductive layer 44c has a configuration where a portion corresponding to the recess HE3 is omitted. In the third embodiment, other configurations for the head suspension assembly and the HDD are the same as those for the head suspension assembly and the HDD according to the first embodiment.

As described above, due to the addition of the second cover insulating layer 44e, a distance between the lower surface of the piezoelectric element 50 and the cover insulating layer 44d located outside the piezoelectric element 50 in the width direction is further widened. Accordingly, in mounting the piezoelectric element 50, the conductive adhesive Ad pushed aside by the piezoelectric element 50 is less likely to be raised to the side surfaces SL1 and SL2 of the piezoelectric element 50. As a result, it is possible to further increase a gap margin MG between the conductive adhesive Ad and the electrode portion of the piezoelectric element 50, and it is possible to reduce the risk of a short-circuit between the conductive adhesive and the electrode portion.

Therefore, in the third embodiment as well, it is possible to provide a head suspension assembly and a disk device, in which the same action effects as those in the first embodiment and the second embodiment are obtained, that is, a short-circuit is prevented and the reliability of electrical connection is improved.

Fourth Embodiment

Figure 10:
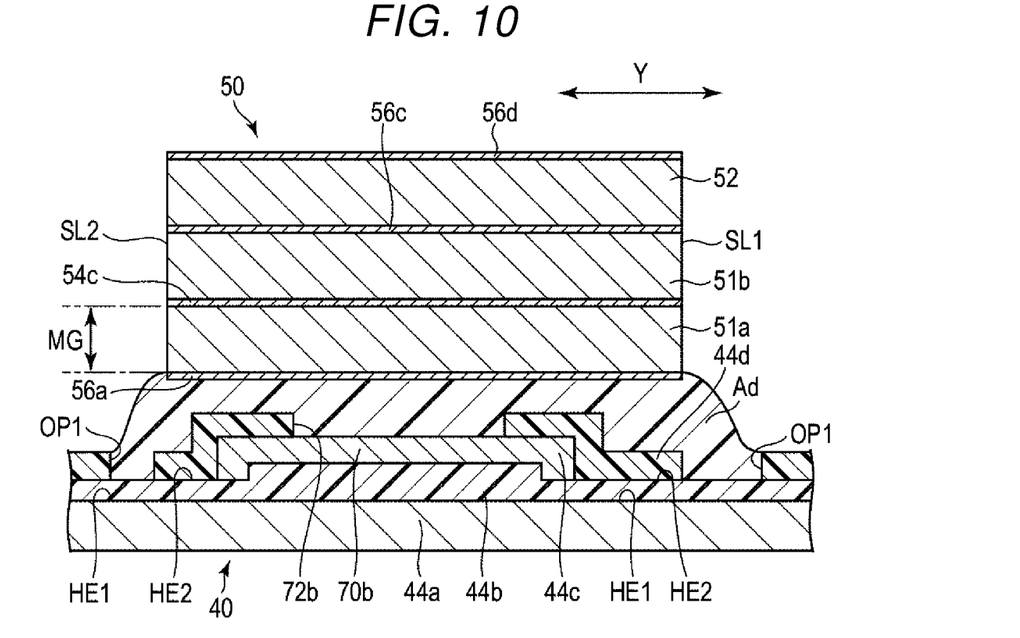
FIG. 10 illustrates a cross-sectional view of a pad portion and a piezoelectric element in an HDD according to a fourth embodiment.

FIG. 10 illustrates a cross-sectional view of a piezoelectric element and a mounting portion in a head suspension assembly according to a fourth embodiment.

As illustrated, according to the fourth embodiment, in the mounting portion 60 of the flexure 40, the metal plate 44a does not have an etched region (the recess HE1), and has a constant plate thickness.

The base insulating layer 44b stacked on the metal plate 44a has a one-step lower etched region (the recess HE2). The recesses HE2 are formed by half-etching a part of the base insulating layer 44b and reducing the layer thickness to about nearly ½. Each recess HE2 is formed into, for example, a substantially rectangular shape. The recesses HE2 are located on both sides of the second connection pad 70b in the width direction. Specifically, two recesses HE2 are located to face both ends of the piezoelectric element 50 in the width direction.

The conductive layer 44c is stacked on the base insulating layer 44b, and a part thereof is located to overlap the recesses HE2 of the base insulating layer 44b. The cover insulating layer 44d is stacked on the conductive layer 44c and the base insulating layer 44b. A part of the cover insulating layer 44d is formed to overlap the recesses HE2 and is recessed along the recesses HE2 to form a one-step lower recessed portion. Further, the cover insulating layer 44d has two openings OP1. Each of the openings OP1 is formed in the region within the cover insulating layer 44d that is provided to overlap the recess HE2. The opening OP1 is formed into, for example, a rectangular shape, and is formed in the recess HE2, at a position facing the end of the piezoelectric element 50 in the width direction, or outside the above end in the width direction.

The conductive adhesive Ad filled between the second connection pad 70b and the piezoelectric element 50 is located on the cover insulating layer 44d, and a part thereof also flows into the recessed portions and the openings OP1 of the cover insulating layer.

In the fourth embodiment, other configurations for the head suspension assembly and the HDD are the same as those for the head suspension assembly and the HDD according to the first embodiment.

According to the fourth embodiment configured as described above, even when the recess is omitted in the metal plate 44a, by forming the recesses HE2 in the base insulating layer 44b, and further forming the openings OP1 in the cover insulating layer 44d, a distance between the lower surface of the piezoelectric element 50 and the cover insulating layer 44d located outside the piezoelectric element 50 in the width direction may be increased. Accordingly, in mounting the piezoelectric element 50, the conductive adhesive Ad pushed aside by the piezoelectric element 50 is less likely to be raised to the side surfaces SL1 and SL2 of the piezoelectric element 50. As a result, it is possible to increase a gap margin MG between the conductive adhesive Ad and the electrode portion of the piezoelectric element 50, and it is possible to reduce the risk of a short-circuit between the conductive adhesive and the electrode portion. Therefore, in the fourth embodiment as well, it is possible to provide a head suspension assembly and a disk device in which a short-circuit is prevented and the reliability of electrical connection is improved.

The present disclosure is not limited to the above described embodiments as they are, and at the implementation stage, components may be modified and embodied within a range that does not deviate from the gist of the present disclosure. Various disclosures may be made by appropriate combinations of a plurality of components disclosed in the above embodiments. For example, some components may be removed from all components illustrated in the embodiments. Moreover, components covering different embodiments may be appropriately combined.

For example, in the above described embodiments, the mounting portion of the flexure has a configuration where etched regions (the recesses HE1 and HE2) are already formed on both the sides of the first connection pad and the sides of the second connection pad, but the present disclosure is not limited thereto. The etched regions may be formed only on the sides of either one of the connection pads. For example, in the piezoelectric element described in the above embodiments, the portions where the first electrode and the second electrode are arranged adjacent to each other in the thickness direction of the piezoelectric element are only the end portions on the sides of the second connection pad. Thus, by forming etched regions (HE1, HE2, and the openings OP1) only on the sides of the second connection pad, it is possible to reduce the risk of short-circuit between the first electrode and the second electrode.

In the configuration according to the above described embodiments, the pair of piezoelectric elements 50 is mounted in the gimbal section 36, and is located on the base end of the load beam 35 with respect to the magnetic head 17, but the present disclosure is not limited thereto. The paired piezoelectric elements may be arranged on, for example, both sides in the width direction of the support (tongue portion) supporting the magnetic head, and may be arranged alongside the magnetic head. Not only the pair of piezoelectric elements, for example, a single piezoelectric element may be used. For the connection pad, not only the rectangular shape, various shapes such as an elliptical shape, a circular shape, and a polygonal shape may be selected.

Further, in the illustrated configuration, the piezoelectric element has the first piezoelectric substrate, the second piezoelectric substrate, and the restraint layer, but the present disclosure is not limited thereto. For example, a piezoelectric element having a single-layer piezoelectric substrate and a restraint layer may be used. In this case, the second electrode has a configuration where the intermediate electrode layer (the seventh electrode portion) is omitted.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A head suspension assembly comprising:
   a support plate;
   a wiring member on the support plate;
   a head mounted on the wiring member and electrically connected to the wiring member; and
   a piezoelectric element mounted on the wiring member and having first and second electrodes electrically connected to the wiring member, wherein
   the wiring member comprises a metal layer, a base insulating layer, a conductive layer, and a cover insulating layer stacked in order,
   the cover insulating layer includes a first pad opening through which the first electrode is connected to the conductive layer with a conducive adhesive therebetween, and
   the base insulating layer includes a first region below the first pad opening and a second region below a side surface of the piezoelectric element, a thickness of the base insulating layer in the second region being less than a thickness of the base insulating layer in the first region.

2. The head suspension assembly according to claim 1, wherein the second region of the base insulating layer is an etched region and the first region of the base insulating layer is a non-etched region.

3. The head suspension assembly according to claim 1, wherein the metal layer includes a third region below the first pad opening and a fourth region below the side surface of the piezoelectric element, a thickness of the metal layer in the fourth region being less than a thickness of the metal layer in the third region.

4. The head suspension assembly according to claim 3, wherein the fourth region of the metal layer is an etched region and the third region of the metal layer is a non-etched region.

5. The head suspension assembly according to claim 1, wherein the metal layer includes a third region below the first pad opening and a fourth region below the side surface of the piezoelectric element, a thickness of the metal layer in the fourth region being the same as a thickness of the metal layer in the third region.

6. The head suspension assembly according to claim 1, wherein the conductive layer includes a fifth region below the first pad opening and a sixth region below the side surface of the piezoelectric element, a thickness of the conductive layer in the sixth region being less than a thickness of the conductive layer in the fifth region.

7. The head suspension assembly according to claim 6, wherein the sixth region of the conductive layer is an etched region and the fifth region of the conductive layer is a non-etched region.

8. The head suspension assembly according to claim 1, wherein the piezoelectric element has a longitudinal side surface and a lateral side surface, and the side surface of the piezoelectric element is the longitudinal side surface.

9. The head suspension assembly according to claim 1, wherein the cover insulating layer includes an opening below the side surface of the piezoelectric element through which the conductive adhesive is connected to the base insulating layer or the conductive layer.

10. The head suspension assembly according to claim 1, wherein
   the cover insulating layer includes a second pad opening through which the second electrode is connected to the conductive layer with a second conducive adhesive therebetween, and
   the base insulating layer includes a third region below the second pad opening and a fourth region below the side surface of the piezoelectric element, a thickness of the base insulating layer in the fourth region being less than a thickness of the base insulating layer in the third region.

11. The head suspension assembly according to claim 1, wherein the second electrode has an exposed portion on the side surface of the piezoelectric element above the second region of the base insulating layer, and the conductive adhesive is electrically separated from the exposed portion of the second electrode.

12. The head suspension assembly according to claim 1, wherein the wiring member further includes a second cover insulating layer provided selectively on a region of the cover insulating layer around the first pad opening.

13. A disk device comprising:
a magnetic disk; and
the head suspension assembly according to claim 1.

14. A head suspension assembly comprising:
a support plate;
a wiring member on the support plate;
a head mounted on the wiring member and electrically connected to the wiring member; and
a piezoelectric element mounted on the wiring member and having first and second electrodes electrically connected to the wiring member, wherein
the wiring member comprises a metal layer, a base insulating layer, a conductive layer, and a cover insulating layer stacked in order,
the cover insulating layer includes a first pad opening through which the first electrode is connected to the conductive layer with a conducive adhesive therebetween, and
the metal layer includes a first region below the first pad opening and a second region below a side surface of the piezoelectric element, a thickness of the metal layer in the second region being less than a thickness of the metal layer in the first region.

15. The head suspension assembly according to claim 14, wherein the second region of the metal layer is an etched region and the first region of the metal layer is a non-etched region.

16. The head suspension assembly according to claim 14, wherein the conductive layer includes a third region below the first pad opening and a fourth region below the side surface of the piezoelectric element, a thickness of the conductive layer in the fourth region being less than a thickness of the conductive layer in the third region.

17. A disk device comprising:
a magnetic disk; and
the head suspension assembly according to claim 14.

* * * * *